US010752361B2

(12) United States Patent
Mutton et al.

(10) Patent No.: US 10,752,361 B2
(45) Date of Patent: Aug. 25, 2020

(54) CIRCULAR MAGNETIC JACK

(71) Applicant: Amphenol Phitek Limited, Auckland (NZ)

(72) Inventors: David Mutton, Huntly (NZ); Randy M. Diaz, Auckland (NZ)

(73) Assignee: Amphenol Phitek Limited, Auckland (NZ)

( * ) Notice: Subject to any disclaimer, the term of this patent is extended or adjusted under 35 U.S.C. 154(b) by 0 days.

(21) Appl. No.: 16/110,946

(22) Filed: Aug. 23, 2018

(65) Prior Publication Data

US 2019/0061952 A1    Feb. 28, 2019

Related U.S. Application Data

(60) Provisional application No. 62/549,203, filed on Aug. 23, 2017.

(30) Foreign Application Priority Data

May 1, 2018    (NZ) ........................................ 742100

(51) Int. Cl.
*H01R 13/60* (2006.01)
*B64D 11/06* (2006.01)
(Continued)

(52) U.S. Cl.
CPC .......... *B64D 11/0624* (2014.12); *H01R 11/30* (2013.01); *H01R 13/6205* (2013.01);
(Continued)

(58) Field of Classification Search
CPC .. H01R 11/30; H01R 13/6205; H01R 13/631; H01R 13/665; H01R 13/6658;
(Continued)

(56) References Cited

U.S. PATENT DOCUMENTS 2,113,138 A * 4/1938 Healey ................ H01R 33/971
192/69.7
3,786,391 A * 1/1974 Mathauser ......... H01R 13/6205
335/205
(Continued)

FOREIGN PATENT DOCUMENTS

CN        106505363 A      3/2017
EP          2628213          3/2012
(Continued)

OTHER PUBLICATIONS

European Search Report for EP18190571 dated Feb. 27, 2019, 9 pgs.

*Primary Examiner* — Abdullah A Riyami
*Assistant Examiner* — Vladimir Imas
(74) *Attorney, Agent, or Firm* — Blank Rome LLP

(57) ABSTRACT

According to an aspect of the present invention, there is provided an electrical connector socket comprising
 a housing having a front face configured to mate with a corresponding face of a corresponding plug;
 at least one electrical connector pin mounted on a mounting assembly inside the housing, the mounting assembly being movable in a direction substantially perpendicular to the front face;
 wherein:
 the mounting assembly includes a magnetic member configured to interact with a corresponding plug-side magnetic member of the plug to establish a magnetic attraction force, to urge the movable mounting assembly towards the front face to a coupling position in which the at least one connector pin protrudes through a corresponding at least one opening in the front face; the mounting assembly further including a resilient member configured to exert a restoring force on the mounting assem-
(Continued)

bly, to urge the mounting assembly towards a rest position in which the at least one connector pin does not protrude from the front face.

Other aspects of the invention include an electrical connector plug, a coupling system comprising an electrical connector socket and an electrical connector plug, and an entertainment system including a coupling system.

18 Claims, 13 Drawing Sheets

(51) Int. Cl.
| | | |
|---|---|---|
| | *H01R 13/62* | (2006.01) |
| | *H01R 13/631* | (2006.01) |
| | *H01R 13/66* | (2006.01) |
| | *H01R 11/30* | (2006.01) |
| | *H01R 13/24* | (2006.01) |
| | *H01R 24/58* | (2011.01) |
| | *H01R 31/06* | (2006.01) |
| | *H01R 24/86* | (2011.01) |
| | *H01R 13/512* | (2006.01) |
| | *B64D 11/00* | (2006.01) |
| | *H01R 24/38* | (2011.01) |

(52) U.S. Cl.
CPC ......... *H01R 13/631* (2013.01); *H01R 13/665* (2013.01); *B64D 11/0015* (2013.01); *H01R 13/2421* (2013.01); *H01R 13/512* (2013.01); *H01R 13/6658* (2013.01); *H01R 24/38* (2013.01); *H01R 24/58* (2013.01); *H01R 24/86* (2013.01); *H01R 31/06* (2013.01)

(58) Field of Classification Search
CPC .. H01R 13/512; H01R 13/2421; H01R 24/38; H01R 24/58; H01R 24/86; H01R 31/06; B64D 11/0624
USPC .......................................................... 439/39
See application file for complete search history.

(56) References Cited

U.S. PATENT DOCUMENTS

| | | | | |
|---|---|---|---|---|
| 4,038,625 | A * | 7/1977 | Tompkins | H01F 38/14 336/83 |
| 4,874,316 | A * | 10/1989 | Kamon | H01R 13/2421 439/39 |
| 5,541,787 | A * | 7/1996 | Jabbari | G11B 5/4846 310/71 |
| 5,784,511 | A * | 7/1998 | Kikuchi | G02B 6/3886 385/53 |
| 6,966,781 | B1 * | 11/2005 | Bullinger | H01R 13/6205 439/289 |
| 8,348,678 | B2 * | 1/2013 | Hardisty | H01R 13/6205 439/39 |
| 8,696,366 | B2 * | 4/2014 | Chen | H01R 11/30 439/39 |
| 90,004,930 | | 4/2015 | Gualino et al. | |
| 9,197,010 | B2 | 11/2015 | Greig et al. | |
| 9,583,897 | B2 * | 2/2017 | Fargo | H01R 24/38 |
| 9,647,386 | B2 * | 5/2017 | Andrus | A61M 1/127 |
| 9,685,742 | B2 * | 6/2017 | Liu | H01R 13/713 |
| 9,689,527 | B2 * | 6/2017 | Franklin | F16M 13/02 |
| 9,893,451 | B2 * | 2/2018 | Zhang | H01R 11/30 |
| 2007/0072443 | A1 * | 3/2007 | Rohrbach | H01R 13/6205 439/39 |
| 2007/0254510 | A1 * | 11/2007 | DeBey | H01R 13/6205 439/188 |
| 2014/0287601 | A1 | 9/2014 | Suh | |
| 2016/0020553 | A1 | 1/2016 | Little | |
| 2016/0093975 | A1 | 3/2016 | Katiyar et al. | |
| 2017/0062999 | A1 | 3/2017 | Thiers | |
| 2018/0191097 | A1 | 7/2018 | Yonnet | |
| 2018/0212359 | A1 | 7/2018 | Wei | |

FOREIGN PATENT DOCUMENTS

| | | |
|---|---|---|
| WO | WO-2012/032230 A1 | 3/2012 |
| WO | 2017/001755 A1 | 1/2017 |

\* cited by examiner

CIRCULAR MAGNETIC JACK

This application claims the benefit of U.S. Provisional Application No. 62/549,203, filed on Aug. 23, 2017 and New Zealand Application No. 742100, filed on May 1, 2018. The entire contents of these applications are hereby incorporated by reference.

FIELD

This invention relates to connector apparatus. The invention is directed particularly, but not solely, to connector apparatus for making electrical connection between a media source and media delivery equipment, for example, an audio signal connection between apparatus such as a headset and an audio signal source such as that provided by an in-flight entertainment system.

BACKGROUND

Conventional connectors typically comprise a socket, and a plug which is received in the socket. For example, in an airline cabin, an in-flight entertainment system may provide media such as audio and video information to passenger seat locations, so that it is available to passengers. The video information is typically made available via a visual display unit located on the rear of a seat immediately in front of the passenger. Audio information is typically provided via a connector socket (sometimes referred to as a jack) which is provided adjacent to the seat, for example, in the arm rest. The user is typically provided with a headset which has a plug which is received in the socket, so that the audio information is delivered to the headset.

A problem can occur when tension is applied to the headset plug. If the tension is applied in a direction so as to pull the plug axially from the socket, then no damage will usually occur. However, if tension is supplied in a direction other than the axial direction, such as a perpendicular direction, then breakage may occur. This is because the plug typically includes one or more elongate pins which are received in the socket. Unless the plug pins are removed in an axial direction, there is a risk that the plug pins can break. This is often a problem within aircraft cabins, since a headset, or headset cable, can frequently be moved unintentionally. One example is a situation in which a passenger forgets that the headset is still being worn and rises from their seat, causing the headset cable to violently pull the plug from the socket. Another example is when an object is being moved in the vicinity of the seat, for example, a pillow or food tray which may catch on the headset cable, causing the plug to be torn from the socket.

A connector apparatus which goes at least some way to addressing the above problems is described in U.S. Ser. No. 13/337,117, now U.S. Pat. No. 9,197,010, the entire contents of which are incorporated herein by reference. According to particular arrangements described therein, electrical connection may be effected by means of conductors (preferably contact pins) which engage with conductor contact regions (preferably formed by a conductive layer on a housing of a socket). Magnets may be used to releasably secure a plug in a socket so as to maintain the connection during normal use but allow for disconnection, including in the abovementioned circumstances.

While the arrangements described in U.S. Ser. No. 13/337,117 provide significant advantages over prior arrangements, there is a continued need for further improvements in the integrity of the connection as well as in avoiding possible failures or improving safety.

Object of the Invention

It is therefore an object of the present invention to provide a connector apparatus which overcomes or ameliorates at least one disadvantage of the prior art, or alternatively to provide the public with a useful choice.

Further objects of the invention will become apparent from the following description.

DISCLOSURE OF THE INVENTION

According to an aspect of the invention, there is provided
An electrical connector socket comprising
a housing having a front face configured to mate with a corresponding face of a corresponding plug;
at least one electrical connector pin mounted on a mounting assembly inside the housing, the mounting assembly being movable in a direction substantially perpendicular to the front face;
wherein:
the mounting assembly includes a magnetic member configured to interact with a corresponding plug-side magnetic member of the plug to establish a magnetic attraction force, to urge the movable mounting assembly towards the front face to a coupling position in which the at least one connector pin protrudes through a corresponding at least one opening in the front face;
the mounting assembly further includes a resilient member configured to exert a restoring force on the mounting assembly, to urge the mounting assembly towards a rest position in which the at least one connector pin does not protrude from the front face.

Preferably, the magnetic member and the resilient member are configured such that the magnetic attraction force surmounts the restoring force when the plug and the electrical connector socket are coupled.

Preferably, the electrical connector includes a first locating feature on the front face, the first locating feature being configured to mechanically match with a corresponding second locating feature of the plug.

Preferably, the first locating feature includes a locating pin protruding from the front face.

Preferably, the locating pin includes an annular notch configured to interact with a mating clip means of the receiving means to enhance the mechanical connection between the electrical socket and the corresponding plug.

Preferably, the locating pin is rigidly mounted to a partition member of the housing, wherein the mounting assembly is arranged between the partition member and the front face, and wherein the locating pin protrudes through a bore in the mounting assembly and through a hole in the front face.

Preferably, the resilient member includes a helical spring and the locating pin is substantially coaxially aligned in a centre portion of said helical spring.

Preferably, the resilient member includes a piece of foamy and/or rubber material, wherein the locating pin is substantially coaxially aligned in a bore portion of said piece of foamy and/or rubber material.

Preferably, the magnetic member includes an annular magnet substantially coaxially aligned with said resilient member.

Preferably, the magnetic member includes an annulus of ferromagnetic material substantially coaxially aligned with said resilient member.

Preferably, the magnetic member includes a plurality of individual magnetic sub-members.

Preferably, the individual magnetic sub-members are circumferentially arranged in a magnet holder around an opening in the magnet holder.

Preferably, the individual magnetic sub-members are arranged in two groups of different magnetic polarity.

Preferably, the individual magnetic sub-members are arranged in the two groups in a ratio of one to three.

Preferably, the first locating feature includes a locating bore in the front face.

Preferably, the locating bore is configured to receive a standard audio plug, wherein the electrical connector socket includes an audio signal transmitter coaxially aligned with the locating bore, the audio signal transmitter being configured to transmit audio signals to the standard audio plug.

Preferably, each connector pin protrudes through the front face at a unique distance from the first locating feature.

Preferably, the front face includes a raised edge delimiting a raised surface protruding from the front face.

Preferably, the raised edge is configured to mate with a corresponding raised rim of the plug to align the electrical connector socket and the plug.

Preferably, the raised edge is circular and the locating pin is arranged centrally of the raised surface.

Preferably, the at least one opening corresponding to the least one connector pin is arranged in the raised surface.

Preferably, each of the at least one corresponding openings corresponds to a single one of the at least one connector pins.

Preferably, the electrical connector socket further includes a conductor port configured to be electrically connected with a conductor, the conductor port having at least one connecting terminals electrically coupled to individual connector pins in order to establish electrical contact between the connector pins and conductor strings of the conductor.

Preferably, the electrical connector socket further includes a conductor electrically coupled to the at least one connector pin inside the housing and extending outside the housing, the conductor including a connector port at an end of the conductor distal to the housing.

Preferably, the connector port is configured to transfer electrical and/or electromagnetic signals.

Preferably, the connector port is configured to transfer analog and/or digital data and/or electrical power.

Preferably, the connector port is one of an analog audio connector port, a universal serial bus (USB) connector port, a high-definition multimedia interface (HDMI) connector port, or a Firewire connector port.

Preferably, the connector port is a female or receptacle port.

Preferably, the connector port is a male or plug port.

Preferably, the at least one connector pin is configured to establish electrical contact with at least one corresponding contact area of the plug.

Preferably, the mounting assembly includes a printed circuit board (PCB).

Preferably, the printed circuit board (PCB) is a finger flex thin PCB or a rigid PCB.

Preferably, the at least one connector pin is a surface mount connector pin mounted to the PCB, preferably a surface mount pogo pin.

According to another aspect of the invention, there is provided

An electrical connector plug comprising
a plug housing having a coupling face configured to mate with a corresponding face of a corresponding electrical connector socket;
at least one electrical contact area distributed over the coupling face and electrically isolated from other electrical contact areas, the at least one electrical contact area being configured to establish electrical contact with at least one corresponding connector pin of the connector socket;
a plug-side magnetic member configured to interact with a corresponding magnetic member of the socket to establish a magnetic attraction force;
wherein the magnetic member is located such that the magnetic attraction force urges the at least one connector pin against the corresponding at least one electrical contact area.

Preferably, the coupling face further includes a second locating feature configured to mechanically match with a corresponding first locating feature of the socket.

Preferably, the second locating feature includes a receiving means in the plug-side coupling face.

Preferably, the second locating feature includes a clip means configured to interact with a mating annular notch of the corresponding first locating feature of the socket to enhance the mechanical connection.

Preferably, the second locating feature includes a bore or recess extending through the plug-side coupling face wherein the clip means is an annular clip means.

Preferably, the second locating feature includes a plug-side locating pin or spherical member protruding from the coupling face.

Preferably, the plug-side magnetic member includes an annular magnet.

Preferably, the plug-side magnetic member includes an annulus of ferromagnetic material.

Preferably, the plug-side magnetic member includes a plurality of individual magnetic plug-side sub-members.

Preferably, the individual plug-side magnetic sub-members are circumferentially arranged.

Preferably, the individual plug-side magnetic sub-members are arranged in two groups of different magnetic polarity.

Preferably, the individual plug-side magnetic sub-members are arranged in the two groups in a ratio of one to three.

Preferably, each of the at least one contact area has the shape of an annulus.

Preferably, the electrical connector plug comprises at least two contact areas, wherein the contact areas are substantially concentrically arranged around the second locating means.

Preferably, the coupling face is substantially circular.

Preferably, the coupling face includes a raised rim delimiting the coupling face, and the second locating feature is substantially centrally arranged on or in the coupling face.

Preferably, the raised rim is configured to mate with a corresponding raised edge of the socket to align the electrical connector plug and the socket.

Preferably, the electrical connector plug further includes a plug-side printed circuit board (PCB) configured to be connected with a plug-side conductor, the plug-side printed circuit board having at least one connecting terminal electrically and individually coupled to the at least one contact area in order to establish electrical contact between the at least one contact area and conductor strings of the plug-side conductor.

Preferably, the electrical connector plug further includes a plug-side conductor electrically coupled to the at least one contact area inside the plug housing, and including a plug-side connector port at an end of the plug-side conductor distal to the plug housing.

Preferably, the plug-side connector port is configured to transfer electrical and/or electromagnetic signals.

Preferably, the plug-side connector port is configured to transfer analog and/or digital data and/or electrical power.

Preferably, the plug-side connector port is one of an analog audio connector port, a universal serial bus (USB) connector port, a high-definition multimedia interface (HDMI) connector port, or a Firewire connector port.

Preferably, the plug-side connector port is a female or receptacle port.

Preferably, the plug-side connector port is a male or plug port.

Preferably, the plug-side conductor is a extending at least partially outside the plug-side housing, and the plug-side connector port is movable relative to the plug-side housing.

Preferably, the plug-side connector port is at least partially integrated in the plug-side housing.

According to another aspect of the invention, there is provided an electrical connector socket comprising
- a housing having a front face configured to mate with a corresponding face of a corresponding plug;
- a first locating feature arranged in a centre portion of the front face, the first locating feature being configured to mechanically match with a corresponding second locating feature of the plug;
- at plurality of electrical connector pins or concentric annular contact areas arranged on the front face such that each connector pin or annular contact area has a unique distance to the locating feature.

According to yet another aspect of the invention, there is provided an electrical connector plug comprising
- a plug housing having a coupling face configured to mate with a corresponding face of a corresponding socket;
- a second locating feature arranged in a centre portion of the coupling face, the second locating feature being configured to mechanically match with a corresponding second locating feature of the socket;
- at plurality of electrical connector pins or concentric annular contact areas arranged on the coupling face such that each connector pin or annular contact area has a unique distance to the second locating feature.

According to another aspect of the invention, there is provided an electrical coupling system comprising at least one electrical connector socket as defined above and at least one electrical connector plug as defined above.

According to another aspect of the invention, there is provided an entertainment system, preferably and in-flight entertainment system, including an audio signal source and a headset, the audio signal source comprising an electrical connector socket as defined above and the headset comprising an electrical connector plug as defined above, wherein an audio and/or video signal is transferred from the audio signal source to the headset the via electrical connector socket and the electrical connector plug.

DRAWING DESCRIPTION

A number of embodiments of the invention will now be described by way of example with reference to the drawings in which FIG. 1 shows a spatial view of an electrical connector socket and an electrical connector plug according to an embodiment of the invention.

DETAILED DESCRIPTION

Figure 1:
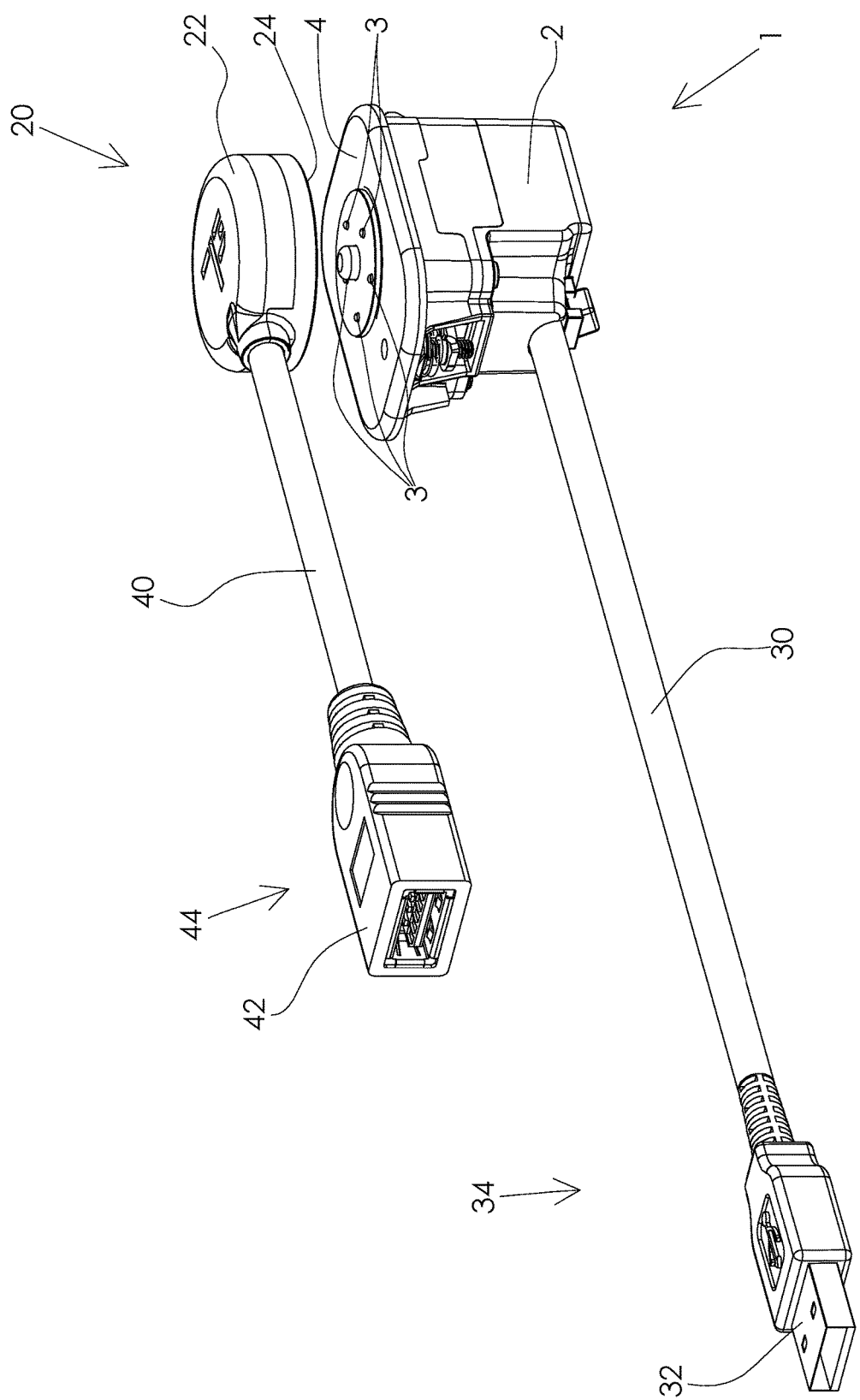

Those skilled in the art will appreciate that the words "socket" or "jack", and "plug" are used for the purposes of convenience, since the connection apparatus and system described in this document comprises components which may not conform to the traditional definition of a socket, jack or plug. Instead, the terms "socket" and "jack" are used to refer generally to a connector component which is connected to a communication system or a media delivery device or system for example, and the term "plug" is used to refer to a connector component which is typically attached to a device used by a user, such as a headset for example.

Although the embodiments discussed below are referred in the context of audio delivery apparatus such as headsets and headphones, the invention is not intended to be limited to that application. Therefore, it should be appreciated that the invention is applicable to connector apparatus in general, and includes within its scope connector apparatus for use in communication systems such as "SKYPE" headsets and/or mobile telephone connection devices and/or MP3 media delivery device charging interfaces or connectors amongst other various applications.

In describing the preferred embodiments of the present invention illustrated in the drawings, specific terminology is resorted to for the sake of clarity. However, the present invention is not intended to be limited to the specific terms so selected, and it is to be understood that each specific term includes all technical equivalents that operate in a similar manner to accomplish a similar purpose.

FIG. 1 shows an electrical connector socket 1 according to an embodiment of the invention.

The connector socket 1 includes a housing 2 having a front face 4 configured to mate with a corresponding face 24 of a corresponding plug 20. The connector socket 1 and the plug 20 together form an electrical coupling system which can be used, according to an aspect of the invention, in an in-flight entertainment system to connect a data and/or audio signal source (not shown) and a headset (not shown) used by a passenger. In certain embodiments, the audio signal source comprises or is connected to the electrical connector socket 1 and the headset comprises or is connected to the electrical connector plug 20. In this arrangement, an audio and/or video signal is transferred from the audio signal source to the headset via the electrical connector socket 1 and the electrical connector plug 20.

In the embodiment depicted in FIG. 1, the electrical connector socket 1 further includes a conductor 30 extending outside the housing for mounting the socket in places remote from the signal source, e.g. in an arm rest of a passenger seat of a vehicle. In the embodiment of FIG. 1, the conductor 30 is a cable. In other embodiments, the conductor could also be rigid and/or include optical fibres or the like. The conductor 30 includes a connector port 32 at an end 34 of the conductor 30 distal to the electrical connector socket 1.

It is to be understood that the shown embodiment represents one of several alternatives to connect the connector socket 1 to the data and/or audio signal source. In the shown embodiment, the connector port 32 a universal serial bus (USB) connector port. In other embodiments, the connector port 32 is an analog audio connector port, a high-definition multimedia interface (HDMI) connector port, or a Firewire connector port, to mention only a few alternatives.

In the embodiment shown in FIG. 1, the connector port 32 is a male or plug port, but in other embodiments, the connector port 32 is a female or receptacle port.

The electrical connector plug 20 shown in FIG. 1 comprises a plug housing 22 having a coupling face 24 configured to mate with the corresponding face 4 of the corresponding electrical connector socket 1. In this embodiment, the electrical connector plug 20 includes a plug-side conductor 40 including a plug-side connector port 42 at an end 44 of the plug-side conductor 40 distal to the plug housing 22.

Similar to what has been stated above, the shown embodiment represents merely one of several alternatives and, while the plug-side connector port 42 is shown to be a universal serial bus (USB) connector port, other embodiments of the plug-side connector port 42 encompass an analog audio connector port, a high-definition multimedia interface (HDMI) connector port, a Firewire connector port, or another alternative connector port.

In the embodiment shown in FIG. 1, the plug-side connector port 42 is a male or plug port, but embodiment are envisaged where the plug-side connector port 42 is a female or receptacle port.

As will be appreciated, depending on the specific configuration of the connector port 32 and the plug-side connector port 42 as outlined above, both the connector port 32 and the plug-side connector port 42 are configured to transfer electrical and/or electromagnetic signals and are configured to transfer analog and/or digital data and/or electrical power.

As can be seen in FIG. 1, the electrical connector socket 1 includes five connector pins 3 at the front face 4. As will be appreciated, the exact number of connector pins 3 is not limited to this example and may vary broadly depending on the specific application. In particular, in some embodiments, the connector socket 1 includes more or less than five connector pins, and may, for instance, include four or six connector pins 3.

Figure 2:
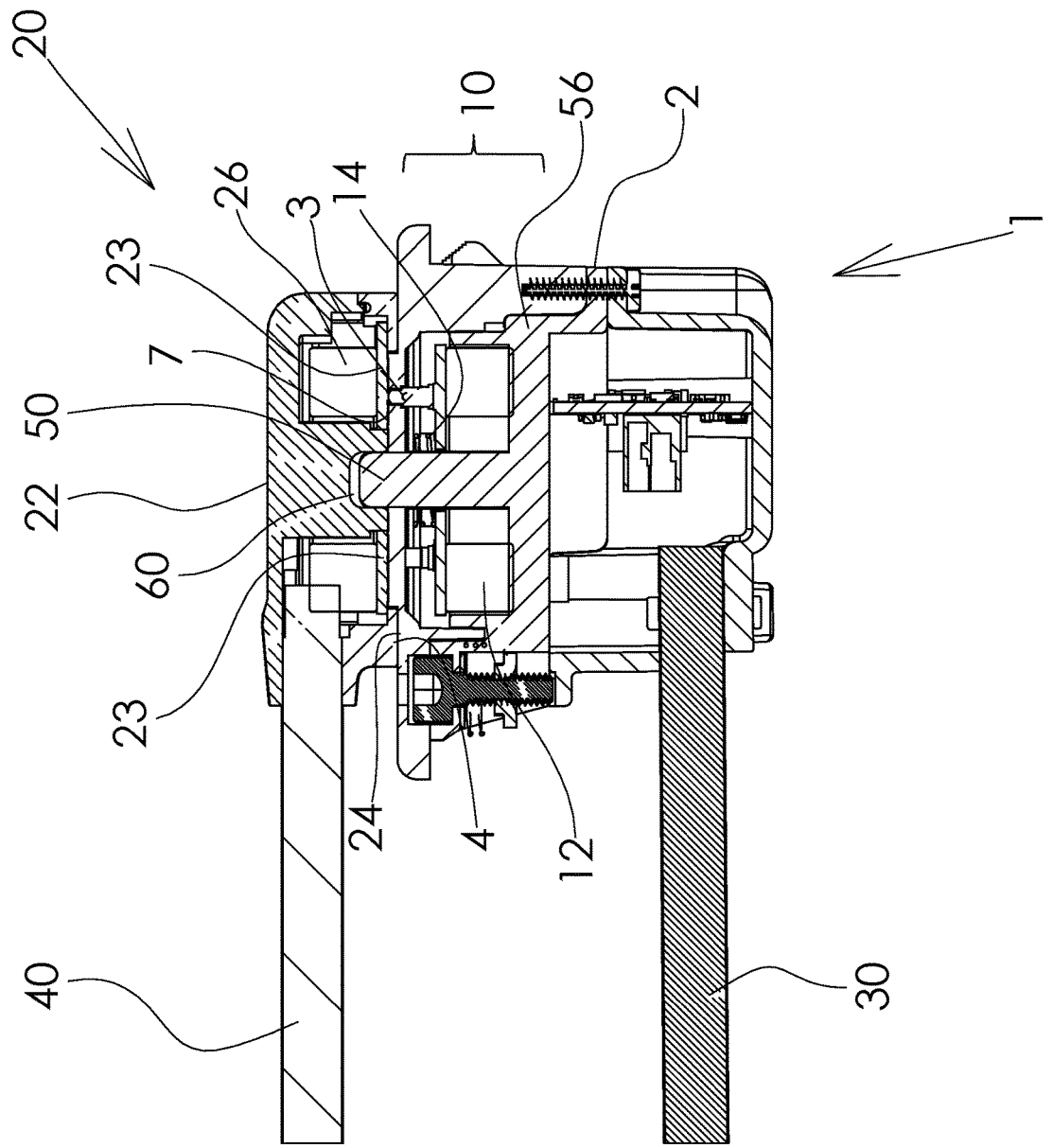
FIG. 2 shows a sectional side view of an electrical connector socket and an electrical connector plug according to an embodiment of the invention.

As can best be seen in FIG. 2, the connector pins 3 mate with corresponding contact areas 23 distributed over the coupling face 24 and electrically isolated from each other. The electrical contact areas 23 are configured to establish electrical contact with the corresponding connector pins 3 of the socket. In the example shown, the electrical plug 20 includes four contact areas 23.

Figure 3:
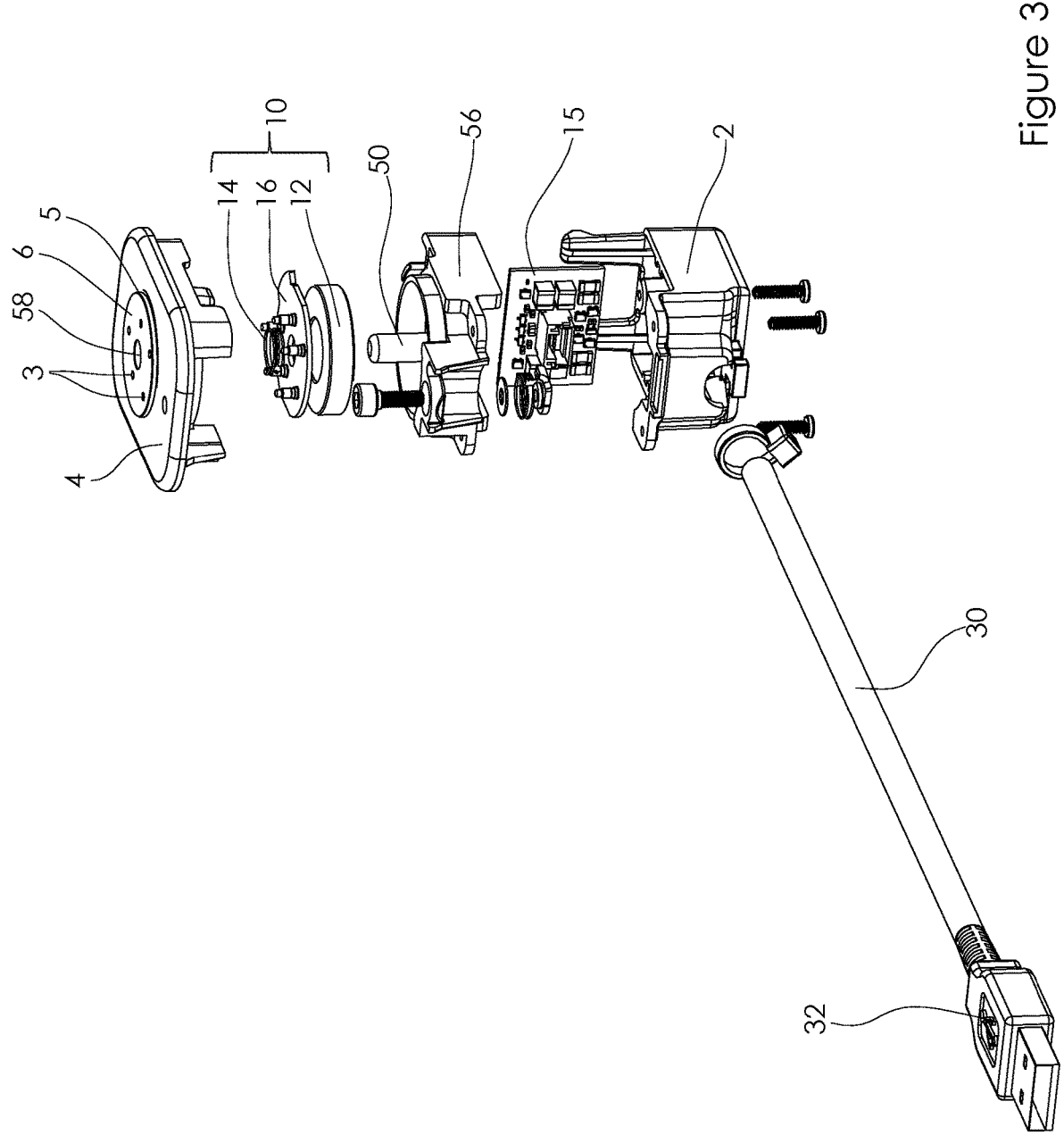
FIG. 3 shows an exploded view of an electrical connector socket and an electrical connector plug according to an embodiment of the invention.

As shown in more detail in FIG. 3, the connector pins 3 are mounted on a mounting assembly 10 inside the housing 2, the mounting assembly 10 being movable in a direction substantially perpendicular to the front face 4 of the housing.

The mounting assembly 10 includes a magnetic member 12 configured to interact with a corresponding plug-side magnetic member 26 of the plug 20 to establish a magnetic attraction force between them when the plug 20 is coupled to the socket 1. The magnetic attraction force urges the movable mounting assembly 10 towards the front face 4 to a coupling position in which the connector pins 3 protrude through corresponding openings 7 in the front face 4.

FIG. 2 shows the movable mounting assembly 10 in coupling position. As will be appreciated, the plug-side magnetic member 26 is located in the plug housing 22 such that the magnetic attraction force urges the connector pins 3 against the corresponding electrical contact areas 23. The connector pins 3 in turn protrude through the corresponding openings 7 in the front face 4 and thus establish contact with the contact areas 23.

The features of the invention allow for a good and reliable electrical contact between the connector pins 3 and the contact areas 23 once the connector socket 1 and the plug 20 are coupled.

Figure 5:
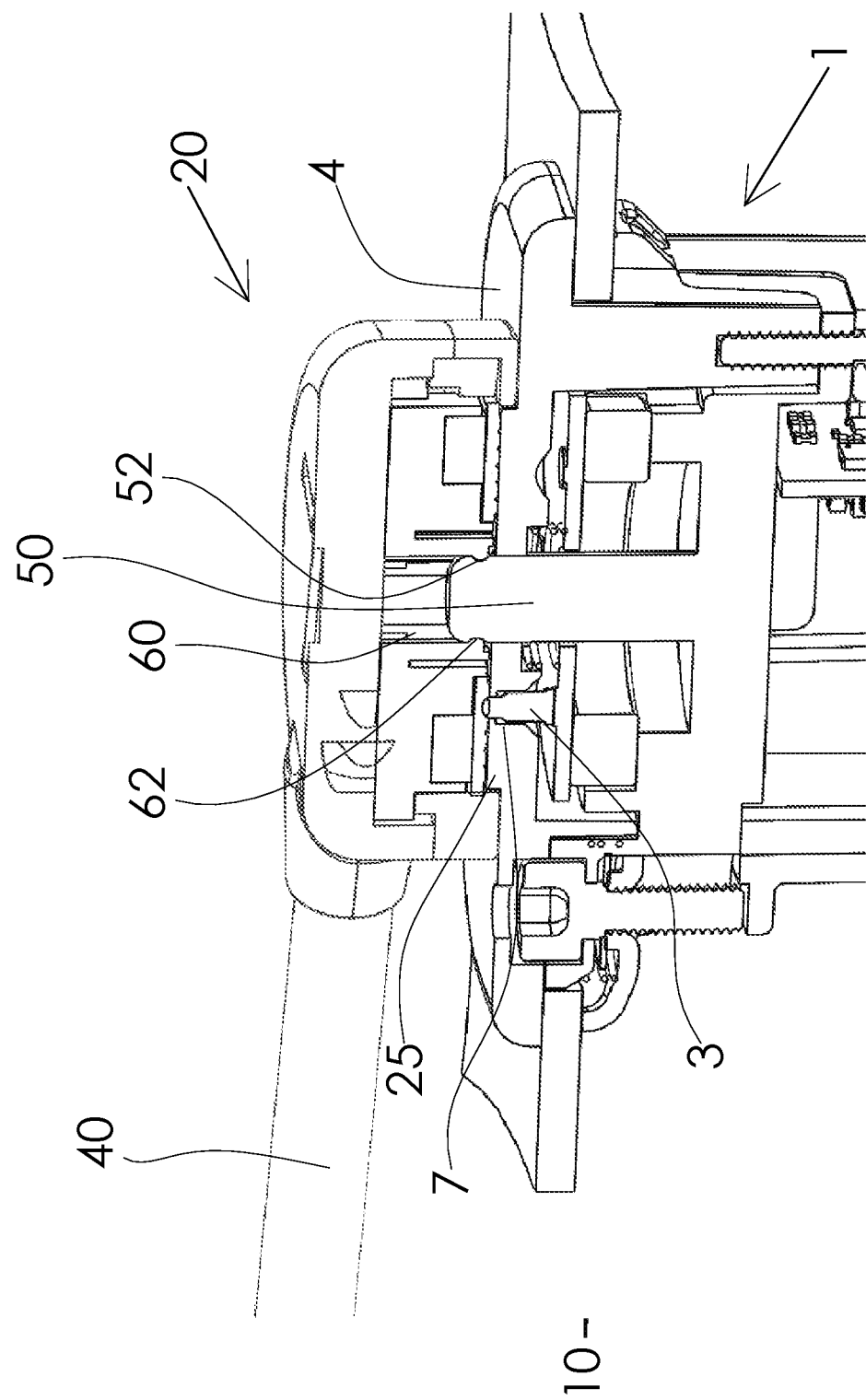
FIG. 5 shows a sectional side view of an alternative embodiment of an electrical connector socket and an electrical connector plug according to the invention.
Figure 6:
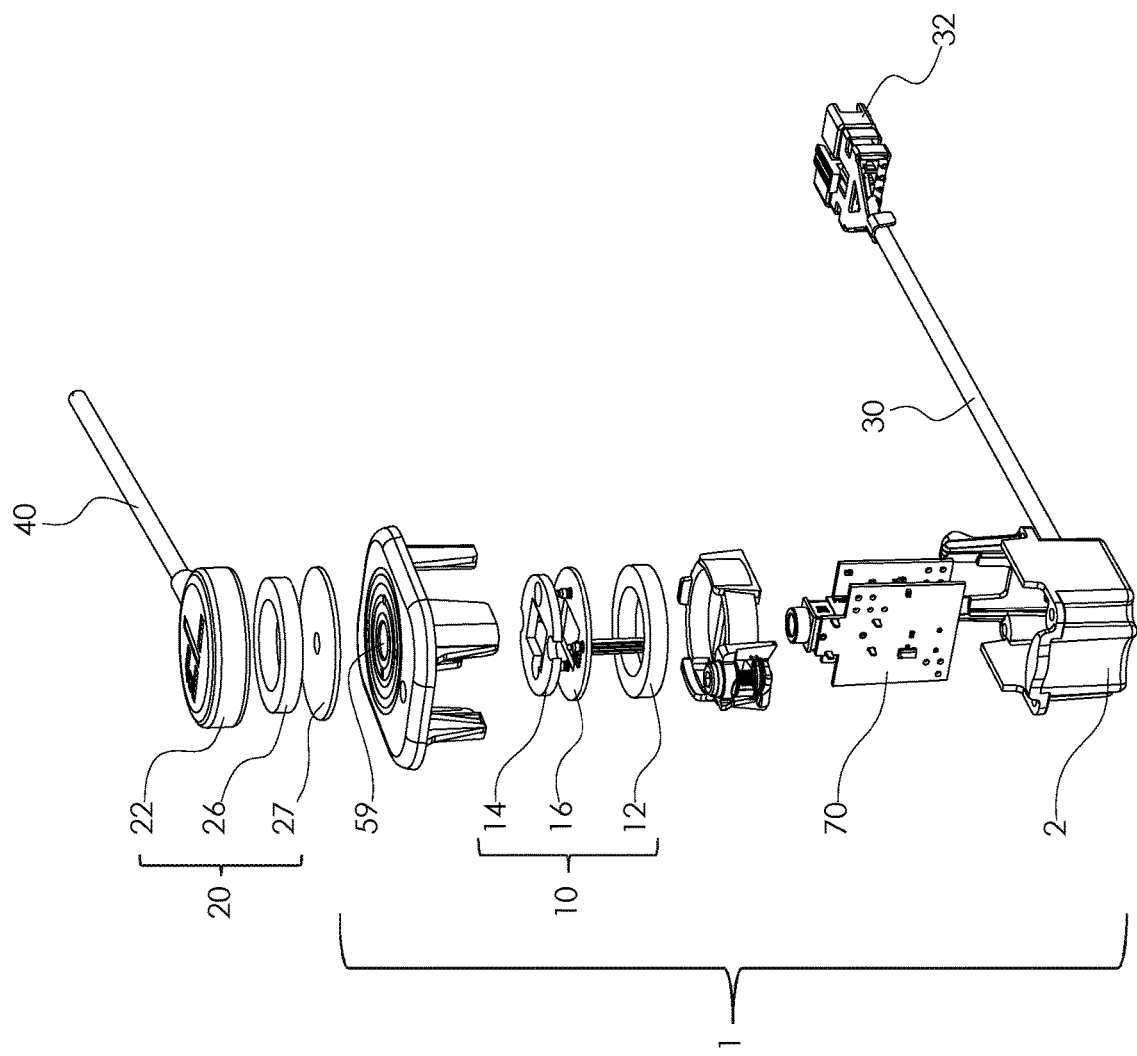
FIG. 6 shows an exploded view of an alternative embodiment of an electrical connector socket and an electrical connector plug according to the invention.

The mounting assembly 10 further includes a resilient member 14, shown in FIGS. 2, 3 and 5, configured to exert a restoring force on the mounting assembly 10, to urge the mounting assembly 10 towards a rest position. In the rest position, the connector pins 3 do not protrude from the front face 4 but are either flush with the front face 4 or stand back to a certain extent inside the housing 2. The resilient member 14 can include a helical spring as shown in FIGS. 2, 3 and 5, a piece of foamy or rubber material as shown in FIG. 6, or any other suitable alternative thereto.

Figure 4:
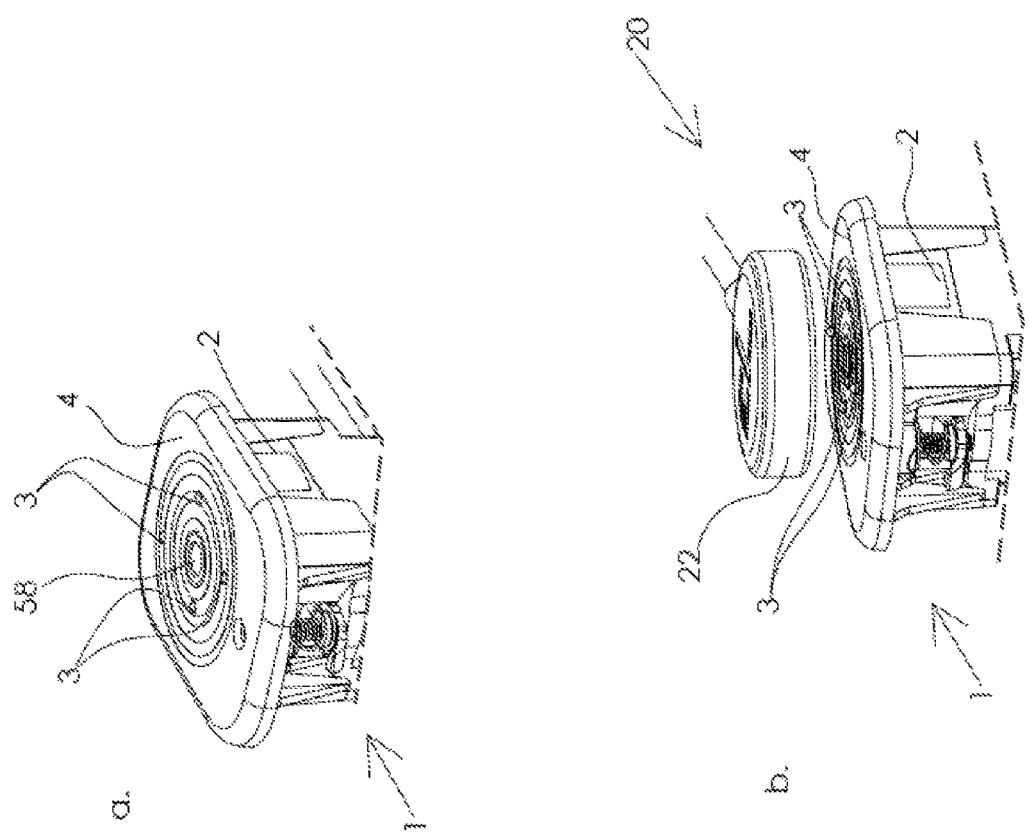
FIGS. 4a-4b shows an embodiment of an electrical connector socket in a rest position and in a coupling position, respectively.

The different positions of the mounting assembly 10 can best be seen in FIG. 4.

In FIG. 4a, no plug 20 is present near the connector socket 1. Hence, the restoring force exerted by resilient member 14 urges the mounting assembly 10 in the rest position in which the connector pins 3 do not protrude from the front face 4.

In the state shown in FIG. 4b, where a plug 20 is near the connector socket 1, the magnetic attraction force created between the magnetic member 12 and the plug-side magnetic member 26 urges the mounting assembly towards the front face 4 to the coupling position. Hence, as shown in the Figure, the connector pins 3 protrude from the front face 4 to mate and establish electrical contact with the corresponding contact areas 23 of the plug 20. It is noted that in the example of FIG. 4, the socket 1 has four connector pins 3.

As will be appreciated by the skilled person, in certain embodiments, the magnetic member 12 and the resilient member 14 are configured such that the magnetic attraction force surmounts the restoring force when the plug 20 and the electrical connector socket 1 are coupled. Embodiments of the invention encompass configurations where the magnetic member 12 and the resilient member 14 are configured such that the magnetic attraction force surmounts the restoring force when a distance between the plug 20 and the electrical connector socket 1 falls below a predetermined threshold, as shown in FIG. 4b where the contact pins 3 already protrude through the front face 4 although coupling between the plug 20 and the socket 1 is actually not yet achieved.

In preferred embodiments, the electrical connector 1 includes a first locating feature on the front face 4, the first locating feature being configured to mechanically match with a corresponding second locating feature arranged on the coupling face 24 of the plug 20. This mechanical connection helps to hold the socket 1 and the plug 20 in place relative to each other and helps to prevent the connector pins 3 from losing contact with the contact areas 23.

As shown in FIGS. 1, 2 and 3, in some embodiments, the first locating feature includes a locating pin 50 protruding from the front face 4 of the socket 1. In these embodiments, the corresponding second locating feature of the plug 20 includes a receiving means 60, see also FIG. 2. In particular, in the embodiment shown in FIG. 2, the receiving means 60 includes a bore or recess in the coupling face 24.

Turning to FIG. 5, and in order to make the mechanical connection between the socket 1 and the plug 20 even more reliable, the locating pin 50 includes an annular notch 52 configured to interact with a mating annular clip means 62 of the receiving means 60 to enhance the mechanical connection.

In other embodiments, as shown in FIG. 2, the locating pin 50 has a smooth shaft without an annular notch 50. Accordingly in these embodiments, the receiving means 60 of the plug 20 might not have an annular clip means 62.

As further shown in FIGS. 2 and 3, the locating pin 50 is rigidly mounted to a partition member 56 of the housing 2, wherein the mounting assembly 10 is arranged between the partition member 56 and the front face 4. The locating pin 50 protrudes through the mounting assembly 10 and through a hole 58 in the front face 4.

The embodiments of FIGS. 2 and 3 furthermore feature a helical spring 14 as resilient member 14. In these embodiments, the locating pin 50 is substantially coaxially aligned in a centre portion of the helical spring 14. The magnetic member 12 in turn is an annular magnet 12 which is also substantially coaxially aligned with the helical spring 14.

Figure 7:
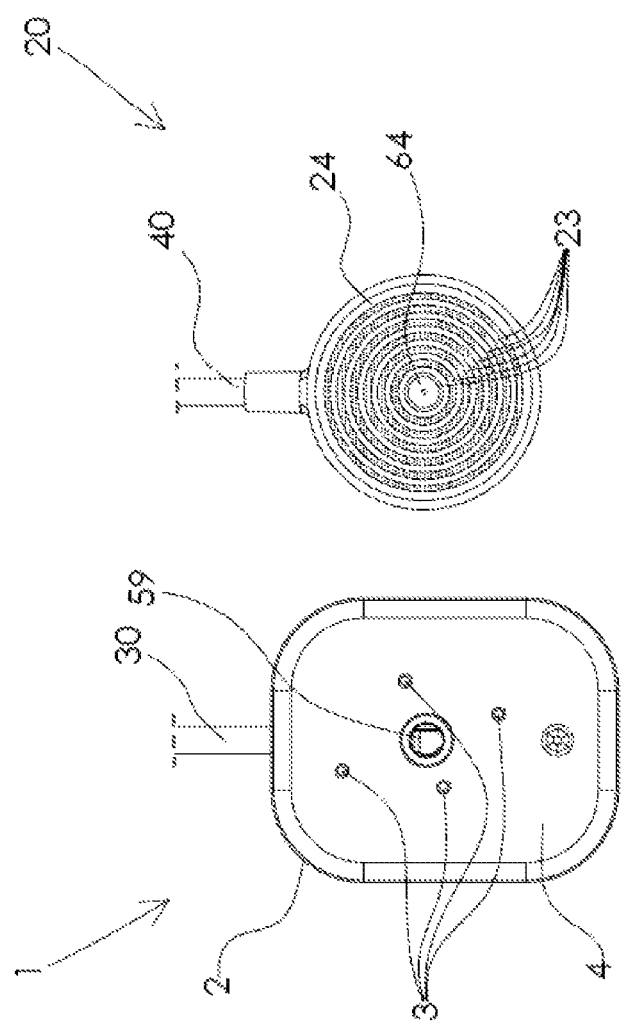
FIG. 7 shows a top view of an electrical connector socket and a bottom view of an electrical connector plug according to an embodiment the invention.

In other embodiments, as shown in FIGS. 4, 6, and 7, the first locating feature includes a locating bore 59 in the front face 4 of the socket 1. In these embodiments, the corresponding second locating feature of the plug 20 is a plug-side locating pin 64 which can best be seen in FIG. 7. Alternatives to the plug-side locating pin 64 in this embodiment include a spherical member protruding at least partially from the plug-side housing 2. Both the plug-side locating pin 64 and the spherical member can be elastically supported inside the plug housing 22 such that they can be pushed inside the plug housing 22 to a certain extent when a respective force is exerted. Such an arrangement can prevent breakage of the first and/or second locating feature in cases where a user is unintentionally applying stress to the connection between the socket 1 and the plug 20.

It is a particular advantage of these embodiments that the locating bore 59 can be configured to receive a standard audio plug and thus establish backwards compatibility of the connector socket 1 with previous plug standards.

For example, in the embodiment shown in FIG. 6, a 3.5 inch mono or stereo audio jack or other standard audio jack (not shown) can be inserted through the locating bore 59 and plugged into an audio signal transmitter 70 coaxially aligned with the locating bore 59 to receive audio via the audio signal transmitter 70.

Figure 9A:
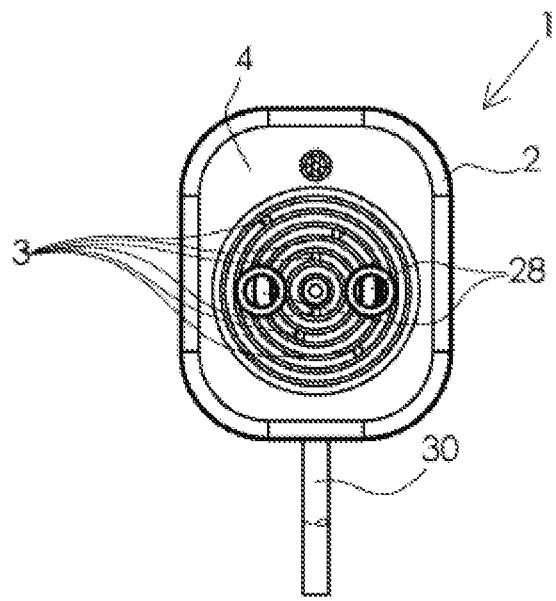
FIGS. 9a-9c shows a top view of an electrical connector socket and a bottom view of an electrical connector plug as well as a sectional side view of the electrical connector socket and the electrical connector plug according to an embodiment the invention.
Figure 9B:
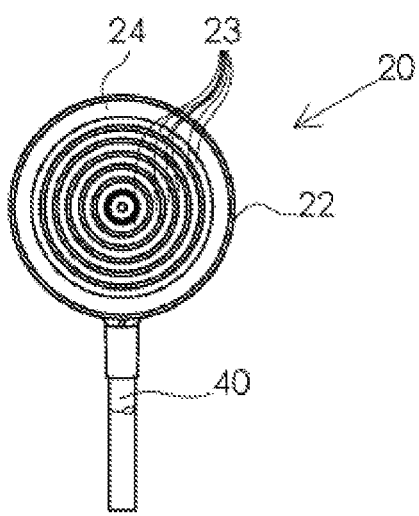
Figure 9C:
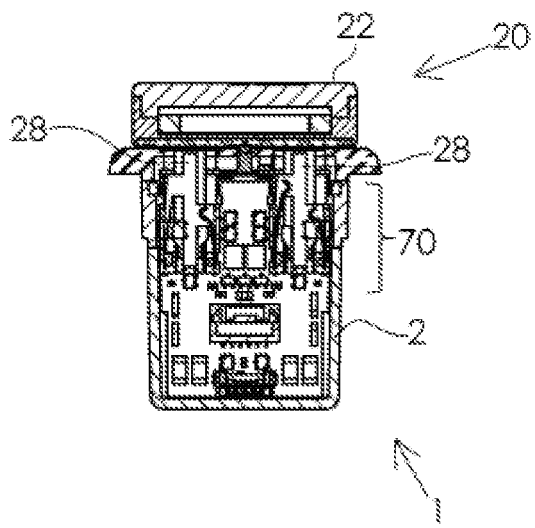

Another alternative to ensure backwards compatibility of the socket 1 is shown in FIG. 9. In this embodiment, the socket 1 includes two standard ports 28 in the front face 4 which can be used in combination with a standard plug (not depicted). As can best be seen in FIG. 9b, the socket 1 includes a respective audio signal transmitter 70 aligned with the standard ports 28 to transmit audio signals to the standard plug not via the connector pins 3 but via the audio signal transmitter 70.

When used with a standard plug, the mounting assembly 10 is in the rest position as no magnetic attraction force is exerted on the mounting assembly 10 in the absence of the plug-side magnetic member 26. Consequently, the connector pins 3 do not protrude from the front face 4 and there is no obstacle on the part of the socket 1 when connection is established with a standard plug via the standard ports 28. Hence, usage of a socket 1 according to this embodiment of the invention in combination with a standard plug is conveniently possible.

However, as the skilled person will appreciate in the light of FIG. 9 that this backwards compatibility does not affect the interaction of the socket with the inventive plug 20.

As shown in FIGS. 1 and 7, independently from the design of the first locating feature, each connector pin 3 of the connector socket 1 protrudes through the front face 4 at a unique distance from the first locating feature. As can be seen in FIG. 7, the corresponding contact areas 23 of the plug 20 have the shape of concentrically arranged annuli with radii to match the unique distances of the corresponding connector pins 3. In other words, the connector pins 3 are configured to establish electrical contact with the corresponding contact areas 23 of the plug 20. That said, in the embodiment shown in FIG. 7, there are four connector pins 3 on the front face 4 of the socket 1 and six potential contact areas 23 on the coupling face 24 of the plug. This means that in the shown embodiment, only four contact areas 23 receive signals from corresponding connector pins 3 when the socket 1 and plug 20 are coupled.

FIG. 7 shows a substantially circular coupling face 24, but the coupling face 24 can basically have any shape.

In the embodiment shown in FIGS. 3 and 5, the front face 4 of the socket 1 includes a raised edge 5 delimiting a raised surface 6 protruding from the front face 4. The raised edge 5 is configured to mate with a corresponding raised rim 25 of the plug 20 which raised rim 25 delimits the coupling face 23 of the plug 1. This configuration offers a simple and reliable way to help align the electrical connector socket 1 and the plug 20, to reduce stresses acting on the first and second locating features, and to help establish a reliable connection between the connector pins 3 and the contact areas 23. In the shown embodiments, the raised edge 5 is circular and the first locating pin 50 is arranged centrally of the raised surface 6.

As further shown in FIG. 5, the openings 7 corresponding to the connector pins 3 are arranged in the raised surface 6. Moreover, each of the openings 7 corresponds to a single one of the connector pins 3, which is also the case in embodiments in which the front face 4 does not exhibit a raised surface 6, as can be seen in FIGS. 4 and 7, respectively.

Turning to FIG. 3, the electrical connector socket 1 further includes a conductor port 15 configured to be electrically connected with the conductor 30. In the present embodiment, the conductor port 15 has at least five connecting terminals (not shown) electrically coupled to individual connector pins 3 in order to establish electrical contact between the connector pins 3 and conductor strings (not shown) of the conductor 30.

As will be understood in light of FIG. 3, the mounting assembly 10 includes a printed circuit board (PCB) 16 electrically interconnected between the conductor port 15 and the individual connector pins 3. The printed circuit board 16 can be of any suitable type, for example a finger flex thin PCB or a rigid PCB.

In the Figures, the connector pins 3 are shown to be surface mount pogo pins 3 mounted to the PCB 16, but could be of any type of surface mount connector pins or connector pins in general.

As can best be seen in FIG. 6, the electrical connector plug 20 may further include a plug-side printed circuit board (PCB) 27 configured to be connected with a plug-side conductor 40, the plug-side printed circuit board 27 having at least one, preferably at least four connecting terminals (not shown) electrically coupled to individual contact areas 23 in order to establish electrical contact between the contact areas 23 and conductor strings (not shown) of the plug-side conductor 40.

In the embodiment shown in FIG. 1, the conductor 40 is a cable extending at least partially outside the plug-side housing 22, and the connector port 42 is movable relative to the plug-side housing 22.

Figure 8:
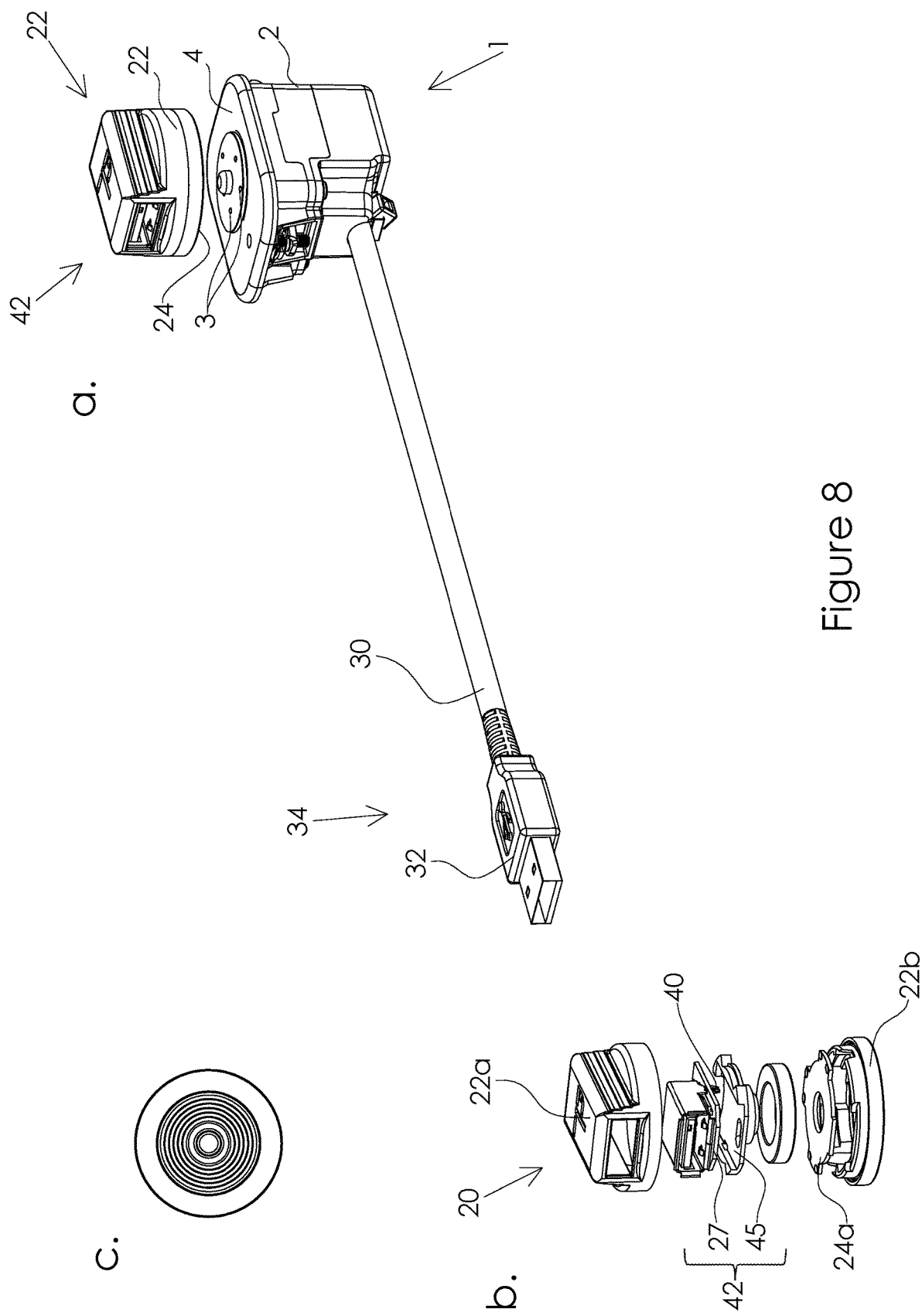
FIGS. 8a-8c shows a spatial view of an electrical connector socket and of an electrical connector plug according to an embodiment the invention, as well as an exploded view and a bottom view of the respective electrical connector plug.

In the embodiment of FIG. 8 however, the connector port 42 forms an integral part of the plug-side housing 22. As will be appreciated in light of FIG. 8a, the plug 20 is rotationally orientable about the socket 1 due to the circular-concentric set up of the front face 4, the coupling face 24, and the first and second locating features. In the present case, the plug housing 22 consists of a first part 22a and a second part 22b connectable thereto. As shown in FIG. 8b, the first 22a and second part 22b of the plug housing 22 sandwich parts of the surface-mount plug-side connector port 42 including the printed circuit board 27 and the plug-side magnetic member 26. The plug-side conductor 40 forms part of the surface mount plug-side connector port 42.

The plug-side connector port 42 furthermore includes an adapter plate 45 configured to connect to the contact areas 23 and to hold the plug-side magnetic member 26 in place. The contact areas 23, also shown in FIG. 8c, are arranged on a carrier 24a which together with parts of the second part 22b of the plug housing 22 forms the coupling face 24.

Figure 10A:
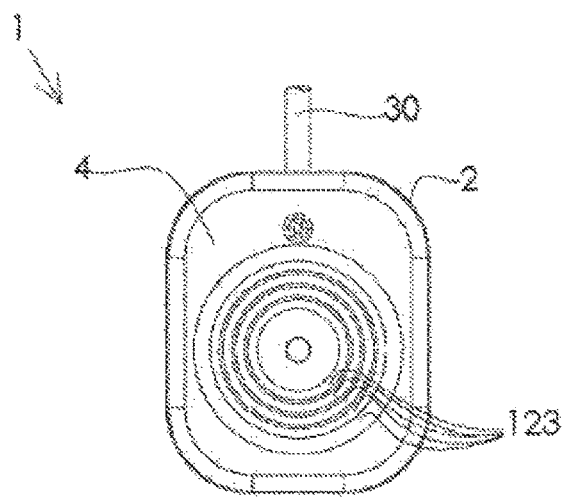
FIGS. 10a-10c shows a top view of an electrical connector socket and a bottom view of an electrical connector plug as well as a sectional side view of the electrical connector socket and the electrical connector plug according to an embodiment the invention.
Figure 10B:
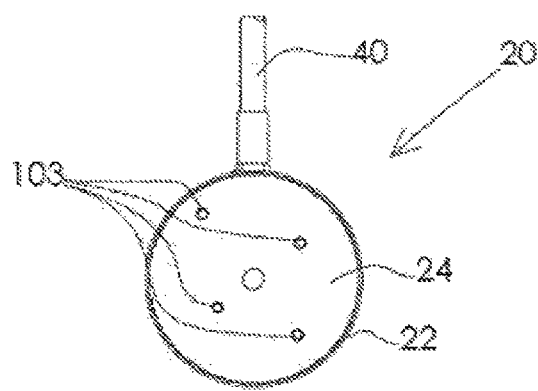
Figure 10C:
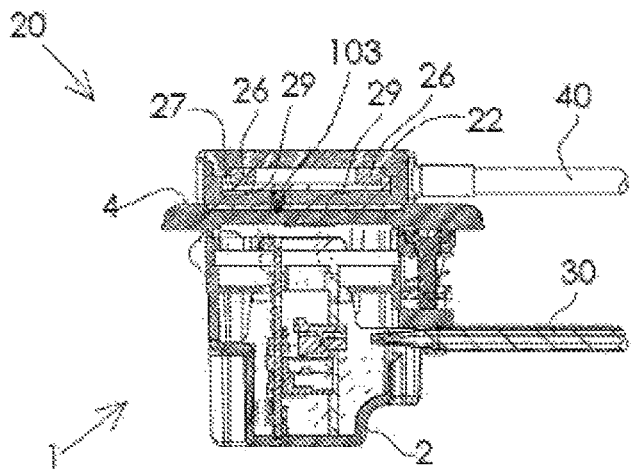

The skilled person will appreciate in the light of FIG. 10 that other embodiments of the invention feature a socket 1 having socket-side contact areas 123 on the front face 4 thereof and a plug 20 the coupling face 4 of which exhibits plug-side connector pins 103. In specific embodiments, a plug-side magnetic member 26 may be used to interact with a plug-side resilient member 29 and corresponding features of the plug 1 to move the plug-side PCB 27 between a coupling position and a rest position in the plug housing 22 of the plug 20 according to the principles laid open in the above.

Figure 11:
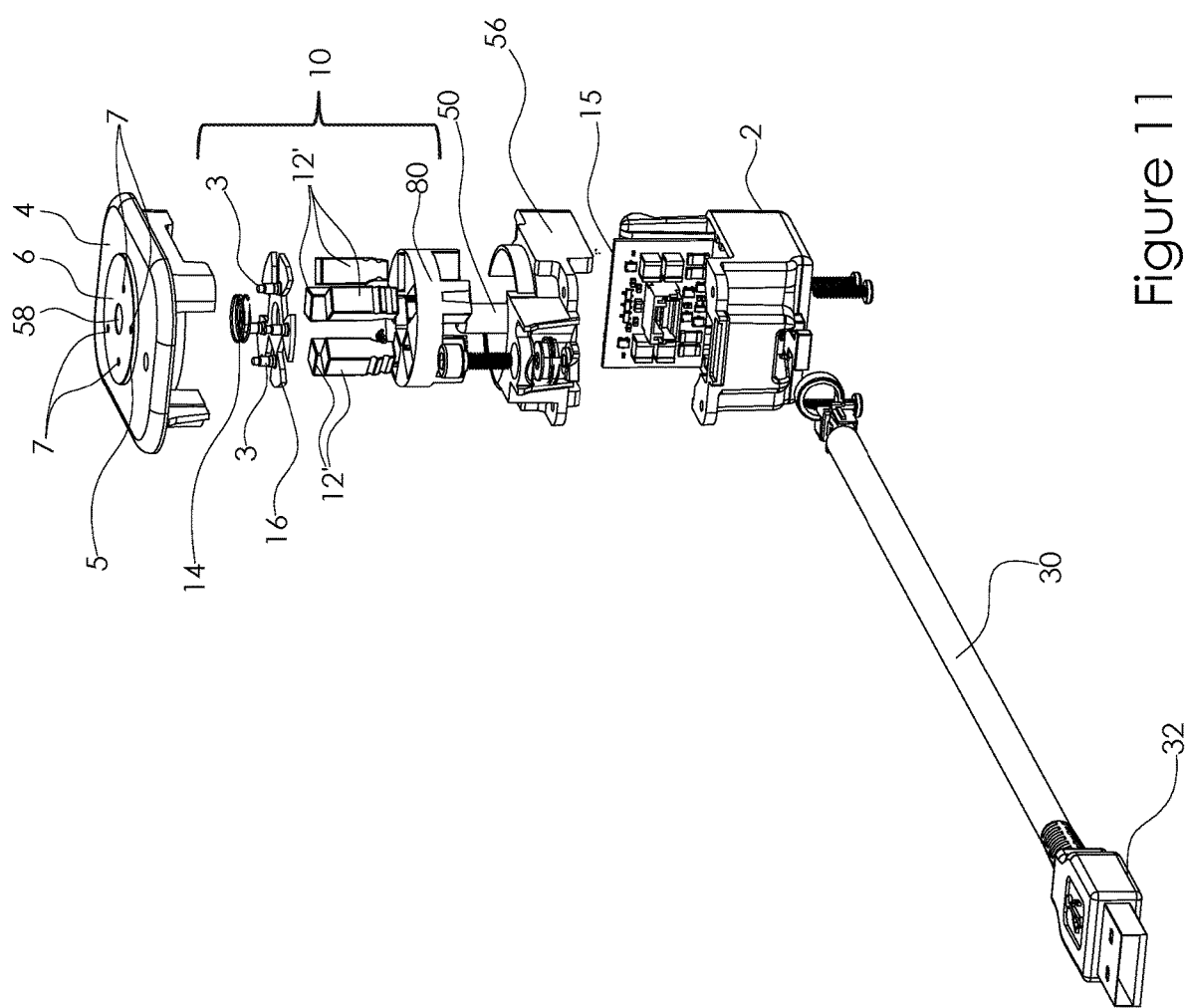
FIG. 11 shows an exploded view of an electrical connector socket and an electrical connector plug according to an embodiment of the invention.
Figure 12:
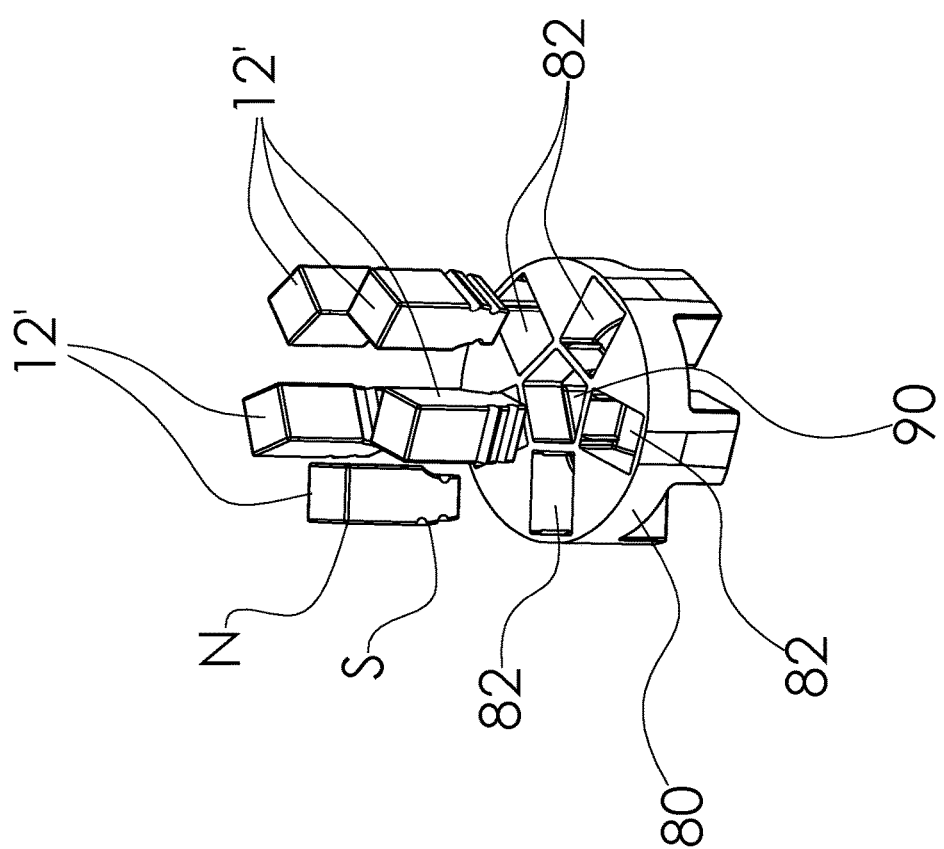
FIG. 12 shows a magnetic member of the electrical connector socket shown in FIG. 11.
Figure 13:
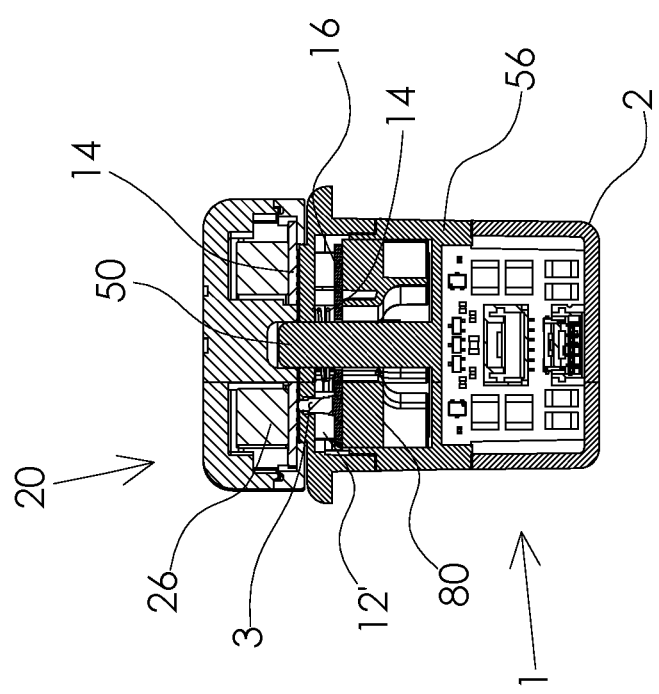
FIG. 13 shows a sectional side view of the electrical connector socket shown in FIG. 11 and an electrical connector plug according to the invention.

In certain embodiments, as shown in FIGS. 11 to 13, respectively, the magnetic member 12 includes a plurality of individual magnetic sub-members 12'. This arrangement can be applied, for example, to achieve a higher magnetic attraction force between the socket 1 and the plug 20.

In the depicted embodiment, five individual magnetic sub-members 12' are circumferentially arranged in and fixedly attached to, a magnet holder 80, which is preferably made of magnetically non-conductive material and exhibits corresponding receptacles 82 to accommodate the magnetic sub-members 12'. In the present embodiment and as best shown in FIG. 12, five magnetic sub-members 12' are evenly distributed along a perimeter of the socket 1 in a generally star-shaped arrangement.

As best shown in FIG. 13, the magnet holder 80 carries the PCB 16 with connector pins 3 mounted thereon. Resilient member 14, PCB 16, magnet holder 80 and magnetic sub-members 12' in this embodiment form the mounting assembly 10 described above in context of FIG. 3. FIG. 13 also shows an electrical connector plug 20 engaged with the electrical connector socket 1.

Similar to what has been explained above, the mounting assembly 10 moves between the rest position and the coupling position as a consequence of the magnetic attraction force exerted between the magnetic sub-members 12' and the plug-side magnetic member 26 of the plug 20 shown in FIG. 13. As a consequence, the connector pins 3 are either protruding through or hiding behind the front face 4 of the housing 2.

In order to provide radial guidance, the magnet holder 80 exhibits an opening 90 configured to receive locating pin 50 which in turn prevents the mounting assembly 10 from any other movement other than along the locating pin 50, which will be appreciated under consideration of FIG. 13 which shows the socket 1 and plug 20 in an assembled and engaged state.

More or less magnetic sub-members 12' than shown in FIGS. 11 to 13 may be used in order to meet certain requirements in terms of the magnetic holding force. Alternatively or in addition to varying the number of magnetic sub-members 12', the individual magnetic sub-members 12' can also be arranged in two groups of different magnetic polarity. For example, in FIG. 12, one of the magnetic sub-members 12' is shown to be oriented such that its magnetic south pole S sits in the magnet holder 80 in the assembled state, while its magnetic north pole sticks out. Assuming that the four remaining sub-members 12' exhibit the opposite polarity, the individual magnetic sub-members 12' would be arranged in the two groups of different polarity in a ratio of one to four. It was found to be preferable that the individual magnetic sub-members 12' are arranged in the two groups in a ratio of one to three.

Similar to the embodiment described in FIGS. 11 to 13, an embodiment of an electric plug 20 according to the invention includes a plug-side magnetic member 26 including a plurality of individual plug-side magnetic sub-members. The individual plug-side magnetic sub-members can be circumferentially arranged in the plug 20 similar to what is discussed in context of FIGS. 11 to 13 above. Also with reference to the above explanations, the individual plug-side magnetic sub-members can be arranged in two groups of different magnetic polarity, wherein the individual plug-side magnetic sub-members are advantageously arranged in the two groups in a ratio of one to three.

It has been found to be preferable to use an electrical connector socket 1 shown in FIG. 11 having a plurality of individual magnetic sub-members 12' of differing polarity in combination with an electrical connector plug 20 the plug-side magnetic member 26 of which includes an annulus of ferromagnetic material, as shown in FIG. 13.

The invention includes the following embodiments. In a first embodiment of the invention, an electrical connector socket comprises a housing having a front face configured to mate with a corresponding face of a corresponding plug; at least one electrical connector pin mounted on a mounting assembly inside the housing, the mounting assembly being movable in a direction substantially perpendicular to the front face; wherein: the mounting assembly includes a magnetic member configured to interact with a corresponding plug-side magnetic member of the plug to establish a magnetic attraction force, to urge the movable mounting assembly towards the front face to a coupling position in which the at least one connector pin protrudes through a corresponding at least one opening in the front face; the mounting assembly further includes a resilient member configured to exert a restoring force on the mounting assembly, to urge the mounting assembly towards a rest position in which the at least one connector pin does not protrude from the front face. A second embodiment of the invention based on the first embodiment, wherein the magnetic member and the resilient member are configured such that the magnetic attraction force surmounts the restoring force when the plug and the electrical connector socket are coupled. A third embodiment of the invention based on the first or second embodiment, further including a first locating feature on the front face, the first locating feature being configured to mechanically match with a corresponding second locating feature of the plug. A fourth embodiment of the invention based on the third embodiment, wherein the first locating feature includes a locating pin protruding from the front face.

A fifth embodiment of the invention based on the fourth embodiment, wherein the locating pin includes an annular notch configured to interact with a mating clip means of the receiving means to enhance the mechanical connection between the electrical socket and the corresponding plug. A sixth embodiment of the invention based on the fourth or fifth embodiment, wherein the locating pin is rigidly mounted to a partition member of the housing, wherein the mounting assembly is arranged between the partition member and the front face, and wherein the locating pin protrudes through a bore in the mounting assembly and through a hole in the front face. A seventh embodiment of the invention based on any of the prior embodiments, wherein the resilient member includes a helical spring and the locating pin is substantially coaxially aligned in a centre portion of said helical spring.

An eighth embodiment of the invention based on any of the prior embodiments, wherein the resilient member includes a piece of foamy and/or rubber material, wherein the locating pin is substantially coaxially aligned in a bore portion of said piece of foamy and/or rubber material. A ninth embodiment of the invention based on any of the prior embodiments, wherein the magnetic member includes an annular magnet substantially coaxially aligned with said resilient member. A tenth embodiment of the invention based on any of the prior embodiments, wherein the magnetic member includes an annulus of ferromagnetic material substantially coaxially aligned with said resilient member. An eleventh embodiment of the invention based on any of the prior embodiments, wherein the magnetic member includes a plurality of individual magnetic sub-members. A twelfth embodiment of the invention based on the eleventh embodiment, wherein the individual magnetic sub-members are circumferentially arranged in a magnet holder around an opening in the magnet holder. A thirteenth embodiment of the invention based on the eleventh or twelfth embodiments, wherein the individual magnetic sub-members are arranged in two groups of different magnetic polarity.

A fourteenth embodiment of the invention based on the thirteenth embodiment, wherein the individual magnetic sub-members are arranged in the two groups in a ratio of one to three. A fifteenth embodiment of the invention based on any of the prior embodiments, wherein the first locating feature includes a locating bore in the front face. A sixteenth embodiment of the invention based on the fifteenth embodiment, wherein the locating bore is configured to receive a standard audio plug, wherein the electrical connector socket includes an audio signal transmitter coaxially aligned with the locating bore, the audio signal transmitter being configured to transmit audio signals to the standard audio plug. A seventeenth embodiment of the invention based on any of the prior embodiments, wherein each connector pin protrudes through the front face at a unique distance from the first locating feature. An eighteenth embodiment of the invention based on any of the prior embodiments, wherein the front face includes a raised edge delimiting a raised surface protruding from the front face. A nineteenth embodiment of the invention based on the eighteenth embodiment, wherein the raised edge is configured to mate with a corresponding raised rim of the plug to align the electrical connector socket and the plug.

A twentieth embodiment of the invention based on the eighteenth or nineteenth embodiments, wherein the raised edge is circular and the locating pin is arranged centrally of the raised surface. A twenty-first embodiment of the invention based on the eighteenth to twentieth embodiments, wherein the at least one opening corresponding to the least one connector pin is arranged in the raised surface. A twenty-second embodiment of the invention based on any of the prior embodiments, wherein each of the at least one corresponding openings corresponds to a single one of the at least one connector pins. A twenty-third embodiment of the invention based on any of the prior embodiments, wherein the electrical connector socket further includes a conductor port configured to be electrically connected with a conductor, the conductor port having at least one connecting terminal electrically coupled to individual connector pins in order to establish electrical contact between the connector pins and conductor strings of the conductor. A twenty-fourth embodiment of the invention based on the twenty-third embodiment, wherein the electrical connector socket further includes a conductor electrically coupled to the at least one connector pin inside the housing and extending outside the housing, the conductor including a connector port at an end of the conductor distal to the housing.

A twenty-fifth embodiment of the invention based on the twenty-fourth embodiment, wherein the connector port is configured to transfer electrical and/or electromagnetic signals. A twenty-sixth embodiment of the invention based on the twenty-fourth or twenty-fifth embodiments, wherein the connector port is configured to transfer analog and/or digital data and/or electrical power. A twenty-seventh embodiment of the invention based on any of the twenty-fourth to twenty-seventh embodiments, wherein the connector port is one of an analog audio connector port, a universal serial bus (USB) connector port, a high-definition multimedia interface (HDMI) connector port, or a Firewire connector port. A twenty-eighth embodiment of the invention based on any of the twenty-fourth to twenty-seventh embodiments, wherein the connector port is a female or receptacle port.

A twenty-ninth embodiment of the invention based on any of the twenty-fourth to twenty-seventh embodiments, wherein the connector port is a male or plug port. A thirtieth embodiment of the invention based on any of the prior embodiments, wherein the at least one connector pin is configured to establish electrical contact with at least one corresponding contact area of the plug. A thirty-first embodiment of the invention based on any of the prior embodiments, wherein the mounting assembly includes a printed circuit board (PCB). A thirty-second embodiment of the invention based on the thirty-first embodiment, wherein the printed circuit board (PCB) is a finger flex thin PCB or a rigid PCB. A thirty-third embodiment of the invention based on any of the thirty-first or thirty-second embodiments, wherein the at least one connector pin is a surface mount connector pin mounted to the PCB, preferably a surface mount pogo pin.

A thirty-fourth embodiment of the invention is an electrical connector plug comprising a plug housing having a coupling face configured to mate with a corresponding face of a corresponding electrical connector socket; at least one electrical contact area distributed over the coupling face and electrically isolated from other electrical contact areas, the at least one electrical contact area being configured to establish electrical contact with at least one corresponding connector pin of the connector socket; a plug-side magnetic member configured to interact with a corresponding magnetic member of the socket to establish a magnetic attraction force; wherein the magnetic member is located such that the magnetic attraction force urges the at least one connector pin against the corresponding at least one electrical contact area.

A thirty-fifth embodiment of the invention based on the thirty-fourth embodiment, wherein the coupling face further includes a second locating feature configured to mechanically match with a corresponding first locating feature of the socket. A thirty-sixth embodiment of the invention based on the thirty-fifth embodiment, wherein the second locating feature includes a receiving means in the plug-side coupling face. A thirty-seventh embodiment of the invention based on any of the thirty-fifth or thirty-sixth embodiments, wherein the second locating feature includes a clip means configured to interact with a mating annular notch of the corresponding first locating feature of the socket to enhance the mechanical connection. A thirty-eighth embodiment of the invention based on any of the thirty-fifth to thirty-seventh embodiments, wherein the second locating feature includes a bore or recess extending through the plug-side coupling face wherein the clip means is an annular clip means. A thirty-ninth embodiment of the invention based on any of the thirty-fifth to thirty-eighty embodiments, wherein the second locating feature includes a plug-side locating pin or spherical member protruding from the coupling face.

A fortieth embodiment of the invention based on any of the thirty-fourth to thirty-ninth embodiments, wherein the plug-side magnetic member is an annular magnet. A forty-first embodiment of the invention based on any of the thirty-fourth to fortieth embodiments, wherein the plug-side magnetic member includes an annulus of ferromagnetic material. A forty-second embodiment of the invention based on any of the thirty-fourth to forty-first embodiments, wherein the plug-side magnetic member includes a plurality of individual plug-side magnetic sub-members. A forty-third embodiment of the invention based on the forty-second embodiment, wherein the individual plug-side magnetic sub-members are circumferentially arranged. A forty-forth embodiment of the invention based on any of the forty-second to forty-third embodiments, wherein the individual plug-side magnetic sub-members are arranged in two groups of different magnetic polarity. A forty-fifth embodiment of the invention based on the forty-fourth embodiment, wherein the individual plug-side magnetic sub-members are arranged in the two groups in a ratio of one to three.

A forty-sixth embodiment of the invention based on any of the thirty-fourth to forty-fifth embodiments, wherein each of the at least one contact area has the shape of an annulus. A forty-seventh embodiment of the invention based on any of the thirty-fourth to forty-sixth embodiments, wherein the electrical connector plug comprises at least two contact areas, wherein the contact areas are substantially concentrically arranged around the second locating means. A forty-eighth embodiment of the invention based on any of the thirty-fourth to forty-seventh embodiments, wherein the coupling face is substantially circular. A forty-ninth embodiment of the invention based on any of the thirty-fourth to forty-eighth embodiments, wherein the coupling face includes a raised rim delimiting the coupling face, and the second locating feature is substantially centrally arranged on or in the coupling face. A fiftieth embodiment of the invention based on the forty-ninth embodiment, wherein the raised rim is configured to mate with a corresponding raised edge of the socket to align the electrical connector plug and the socket. A fifty-first embodiment of the invention based on any of the thirty-fourth to fiftieth embodiments, wherein the electrical connector plug further includes a plug-side printed circuit board (PCB) configured to be connected with a plug-side conductor, the plug-side printed circuit board having at least one connecting terminal electrically and individually coupled to the at least one contact area in order to establish electrical contact between the at least one contact area and conductor strings of the plug-side conductor.

A fifty-second embodiment of the invention based on any of the thirty-fourth to fifty-first embodiments, wherein the electrical connector plug further includes a plug-side conductor electrically coupled to the at least one contact area inside the plug housing, and including a plug-side connector port at an end of the plug-side conductor distal to the plug housing. A fifty-third embodiment of the invention based on the fifty-second embodiment, wherein the plug-side connector port is configured to transfer electrical and/or electromagnetic signals. A fifty-fourth embodiment of the invention based on any of the fifty-second or fifty-third embodiments, wherein the plug-side connector port is configured to transfer analog and/or digital data and/or electrical power. A fifty-fifth embodiment of the invention based on any of the fifty-second fifty-fourth embodiments, wherein the plug-side connector port is one of an analog audio connector port, a universal serial bus (USB) connector port, a high-definition multimedia interface (HDMI) connector port, or a Firewire connector port. A fifty-sixth embodiment of the invention based on any of the fifty-second to fifty-fifth embodiments, wherein the plug-side connector port is a female or receptacle port.

A fifty-seventh embodiment of the invention based on any of the fifty-second to fifty-fifth embodiments, wherein the plug-side connector port is a male or plug port. A fifty-eighth embodiment of the invention based on any of the fifty-second to fifty-seventh embodiments, wherein the plug-side conductor is a extending at least partially outside the plug-side housing, and the plug-side connector port is movable relative to the plug-side housing. A fifty-ninth embodiment of the invention based on any of the fifty-second to fifty-seventh embodiments, wherein the plug-side connector port is at least partially integrated in the plug-side housing.

A sixtieth embodiment of the invention is an electrical connector socket comprising a housing having a front face configured to mate with a corresponding face of a corresponding plug; a first locating feature arranged in a centre portion of the front face, the first locating feature being configured to mechanically match with a corresponding second locating feature of the plug; at plurality of electrical connector pins or concentric annular contact areas arranged on the front face such that each connector pin or annular contact area has a unique distance to the locating feature. A sixty-first embodiment of the invention is an electrical connector plug comprising a plug housing having a coupling face configured to mate with a corresponding face of a corresponding socket; a second locating feature arranged in a centre portion of the coupling face, the second locating feature being configured to mechanically match with a corresponding second locating feature of the socket; at plurality of electrical connector pins or concentric annular contact areas arranged on the coupling face such that each connector pin or annular contact area has a unique distance to the second locating feature.

A sixty-second embodiment of the invention is an electrical coupling system comprising at least one electrical connector socket according to any of the first to thirty-third embodiments and at least one electrical connector plug according to any of the thirty-fourth to fifty-ninth embodiments. A sixty-third embodiment of the invention is an entertainment system, preferably and in-flight entertainment system, including an audio signal source and a headset, the audio signal source comprising an electrical connector socket according to any of the first to thirty-third embodiments and the headset comprising an electrical connector plug according to any of the thirty-fourth to fifty-ninth embodiments, wherein an audio and/or video signal is transferred from the audio signal source to the headset the via electrical connector socket and the electrical connector plug.

The invention claimed is:

1. An electrical connector socket comprising
a housing having a front face configured to mate with a corresponding face of a corresponding plug;
at least one electrical connector pin mounted on a mounting assembly inside the housing, the mounting assembly being movable in a direction substantially perpendicular to the front face;
wherein:
the mounting assembly includes a magnetic member configured to interact with a corresponding plug-side magnetic member of the plug to establish a magnetic attraction force, to urge the movable mounting assembly towards the front face to a coupling position in which the at least one connector pin protrudes through a corresponding at least one opening in the front face;
the mounting assembly further includes a resilient member configured to exert a restoring force on the mounting assembly, to urge the mounting assembly towards a rest position in which the at least one connector pin does not protrude from the front face.

2. The electrical connector socket according to claim 1, wherein the magnetic member and the resilient member are configured such that the magnetic attraction force surmounts the restoring force when the plug and the electrical connector socket are coupled.

3. The electrical connector socket according to claim 1, further including a first locating feature on the front face, the first locating feature being configured to mechanically match with a corresponding second locating feature of the plug.

4. The electrical connector socket according to claim 3, wherein the first locating feature includes a locating pin protruding from the front face.

5. The electrical connector socket according to claim 1, wherein the resilient member includes a helical spring or a piece of foamy and/or rubber material, and wherein the locating pin is substantially coaxially aligned in a centre portion of said helical spring or substantially coaxially aligned in a bore portion of said piece of foamy and/or rubber material, respectively.

6. The electrical connector socket according to claim 1, wherein the magnetic member includes an annular magnet or an annulus of ferromagnetic material substantially coaxially aligned with said resilient member.

7. The electrical connector socket according to claim 1, wherein the magnetic member includes a plurality of individual magnetic sub-members circumferentially arranged in a magnet holder around an opening in the magnet holder.

8. The electrical connector socket according to claim 1, wherein the first locating feature includes a locating bore in the front face, and wherein the locating bore is configured to receive a standard audio plug, wherein the electrical connector socket includes an audio signal transmitter coaxially aligned with the locating bore, the audio signal transmitter being configured to transmit audio signals to the standard audio plug.

9. The electrical connector socket according to claim 1, wherein each connector pin protrudes through the front face at a unique distance from the first locating feature.

10. The electrical connector socket according to claim 1, wherein the at least one connector pin is configured to establish electrical contact with at least one corresponding contact area of the plug.

11. The electrical connector socket according to claim 1, wherein the mounting assembly includes a printed circuit board (PCB), preferably a finger flex thin PCB or a rigid PCB, and wherein the at least one connector pin is a surface mount connector pin mounted to the PCB, preferably a surface mount pogo pin.

12. An electrical connector plug comprising
a plug housing having a coupling face configured to mate with a corresponding face of a corresponding electrical connector socket;
at least one electrical contact area distributed over the coupling face and electrically isolated from other electrical contact areas, the at least one electrical contact area being configured to establish electrical contact with at least one corresponding connector pin of the connector socket, and the coupling face including a second locating feature configured to mechanically match with a corresponding first locating feature of the socket;
a plug-side magnetic member configured to interact with a corresponding magnetic member of the socket to establish a magnetic attraction force;
wherein the magnetic member is located such that the magnetic attraction force urges the at least one connector pin against the corresponding at least one electrical contact area; and
wherein each of the at least one contact area has the shape of an annulus, and wherein the at least one contact area is substantially concentrically arranged around the second locating means.

13. An electrical connector plug according to claim 12, wherein the second locating feature includes a receiving means in the plug-side coupling face.

14. An electrical connector plug according to claim 12, wherein the second locating feature includes a bore or recess extending through the plug-side coupling face wherein the clip means is an annular clip means.

15. An electrical connector plug according to claim 12, wherein the second locating feature includes a plug-side locating pin or spherical member protruding from the coupling face.

16. An electrical connector plug according to claim 12, wherein the plug-side magnetic member includes an annular magnet or an annulus of ferromagnetic material.

17. An electrical connector plug according to claim 12, further including a plug side printed circuit board (PCB) configured to be connected with a plug side conductor, the plug side printed circuit board having at least one electric terminal electrically and individually coupled to the at least one contact area in order to establish electrical contact between the at least one contact area and conductor strings of the plug side conductor.

18. An electrical coupling system comprising at least one electrical connector socket according to claim 1 and at least one electrical connector plug.

* * * * *